Patented Oct. 20, 1953

2,656,361

UNITED STATES PATENT OFFICE 2,656,361

THIENYL VAT DYE COMPOUNDS AND VAT DYE INTERMEDIATES AND PROCESSES FOR THEIR PREPARATION

James M. Straley and Raymond C. Harris, Kingsport, Tenn., assignors to Eastman Kodak Company, Rochester, N. Y., a corporation of New Jersey No Drawing. Application March 29, 1951, Serial No. 218,264

8 Claims. (Cl. 260—329.2)

This invention relates to new vat dye compounds, to new vat dye intermediates and to the processes for preparing the new compounds of the invention.

The new vat dye intermediates of the invention are prepared by condensing a 10-methyleneanthrone compound which is unsubstituted in at least one of the 4- and 5-positions with a vinyl ketone of the thiopene series, or with a compound which will liberate these ketones, to form what are probably Bz 1-thenoylbenzanthrone compounds. The course of the reaction is believed to be as illustrated below:

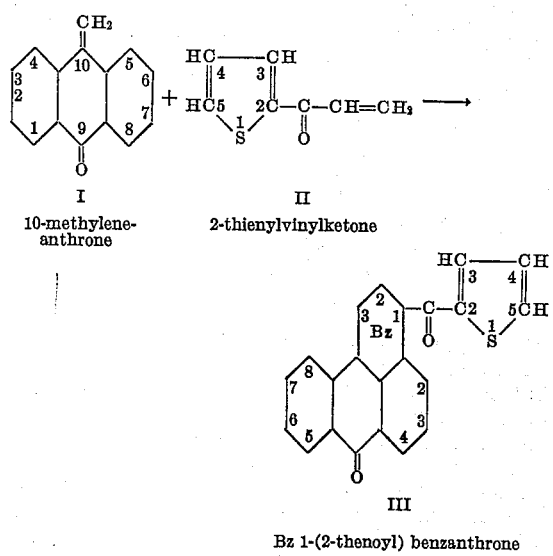

The various nuclei are numbered as indicated above.

The new vat dye compounds of the invention are prepared by ring closing the Bz 1-thenoylbenzanthrone vat dye intermediate compounds. The course of the reaction is believed to be as illustrated hereinafter:

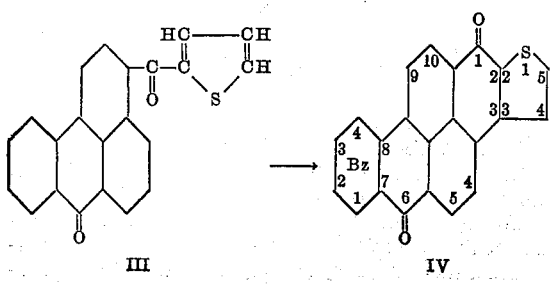

Based upon

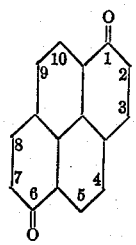

as being pyrene-1,6-dione, the new vat dye compounds of the invention can be termed 2,3-thienyl-7,8-benzo-pyrene-1,6-dione compounds. Under this nomenclature, the compound numbered IV is 2,3-(2,3-thienyl)-7,8-benzo-pyrene-1,6-dione. That is, the thienyl nucleus is joined through its 2- and 3-positions to the 2- and 3-positions of the pyrenedione nucleus and a benzene nucleus is joined to the 7- and 8-positions of the pyrenedione nucleus. As indicated hereinafter, where a Bz 1-(3-thenoyl) benzanthrone compound is employed rather than a Bz 1-(2-thenoyl) benzanthrone compound 2,3-(3,4-thienyl)-7,8-benzo-pyrene-1,6-dione vat dye compounds are obtained, that is, the thienyl nucleus is attached through its 3- and 4-positions to the 2- and 3-positions of the pyrenedione nucleus.

It is an object of the invention to provide new vat dye compounds. Another object of the invention is to provide new valuable vat dye intermediates which are probably Bz 1-thenoylbenzanthrone compounds. A further object is to provide satisfactory processes for the preparation of the new compounds of the invention.

In preparing the new Bz 1-thenoylbenzanthrone compounds of the invention, a 10-methyleneanthrone which is unsubstituted in at least one of the 4- and 5-positions is condensed with a thiophene vinyl ketone. The condensation reaction is ordinarily carried out in the presence of a solvent such as acetic acid, nitrobenzene or o-nitrotoluene, for example. Further, the use of a mild oxidant has been found to be beneficial and is preferred. Oxidants that can be employed include, for example, air, oxygen and nitrated aromatic hydrocarbons such as nitrobenzene, o-nitrotoluene, m-nitrotoluene or p-nitrotoluene, for example. The reaction can be carried out at any suitable temperature. However, the use of temperatures of 160° C. or above is preferred. Temperatures of about 160° C. to about 180° C., for example, are suitable. Some oxidants can serve both as the oxidant and the solvent. To illustrate, when nitrobenzene is employed as the oxidant, it can also serve as the solvent.

The new Bz 1-thenoylbenzanthrone compounds of the invention in general have the formula:

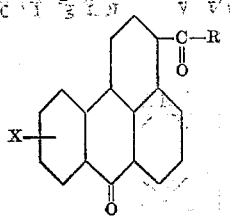

wherein R represents a thienyl radical and X represents a hydrogen atom, a chlorine atom, a bromine atom, a fluorine atom or a methyl group.

The term "a thiophene vinyl ketone" as used herein includes thiophene vinyl ketone compounds such as 2-thienylvinylketone, 3-thienylvinylketone, or 2,5-dichloro-3-thienylvinylketone as well as substances which will liberate these ketones, such as 2,5-dichloro-3-(β-dimethylaminopropionyl)-thiophene hydrochloride.

10-methyleneanthrone compounds that can be employed include, for example, 10-methyleneanthrone, 10-methylene-2-chloroanthrone, 10-methylene-1-methylanthrone, 10-methylene-4-bromoanthrone, 10-methylene-1-fluoroanthrone, 10-methylene-3-methylanthrone, 10-methylene-3-chloroanthrone, 10-methylene-2-methylanthrone and 10-methylene-1-chloroanthrone.

As previously indicated, the new vat dye compounds of the invention are prepared by ring closing the Bz 1-thenoylbenzanthrone vat dye intermediate compounds. The ring closure may be effected using various techniques. However, it is preferred to effect the ring closure by means of the action of a mild oxidant, such as $MnO_2$ or $O_2$, in an $AlCl_3$–NaCl melt, at a temperature in excess of 120° C.

The new vat dye compounds of the invention dye cotton well from a hot, strongly alkaline vat. The dyeings obtained possess good fastness properties. In general, the new vat dye compounds have the formula:

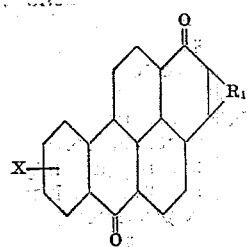

wherein $R_1$ stands for the atoms necessary to complete a thienyl radical and X represents a hydrogen atom, a chlorine atom, a bromine atom, a fluorine atom or a methyl group.

The following examples illustrate the compounds of our invention and the manner in which they are prepared. Parts are expressed as parts by weight.

*Preparation of vat dye intermediates*

EXAMPLE 1

Fifteen parts of 2-thienylvinylketone, 22 parts of 10-methyleneanthrone and 100 cc. of acetic acid were refluxed together and stirred by passing air through the reaction mixture for five hours. Upon cooling, 5 parts of a greenish powder separated from the reaction mixture and was recovered by filtration. The reaction product thus obtained melted at 260° C. with decomposition. Its solution in concentrated sulphuric acid is a bright orange. The product is believed to be Bz 1-(2-thenoyl)benzanthrone, having the formula numbered III.

By the use of 15 parts of 3-thienylvinylketone in place of 2-thienylvinylketone in the above example Bz 1-(3-thenoyl)benzanthrone having the formula:

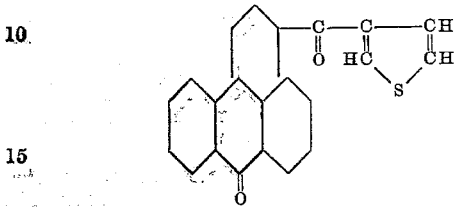

is obtained.

EXAMPLE 2

Thirty-four parts of 2,5-dichloro-3-(β-dimethylaminopropionyl)-thiophene hydrochloride, 25 parts of 10-methyleneanthrone and 250 parts of nitrobenzene were heated together, with stirring, at 160° C. An exothermic reaction resulted, bringing the temperature to about 170° C. After maintaining the reaction mixture at 180° C. for 45 minutes, while stirring, the reaction mixture was cooled and diluted at 80° C. with an equal volume of methyl alcohol, chilled and filtered. Twenty-one parts of a greenish-yellow solid melting at about 150° C. were obtained on the filter. Its solution in concentrated $H_2SO_4$ is scarlet. The reaction product is believed to be Bz 1-[3-(2,5-dichlorothenoyl)]benzanthrone, having the formula:

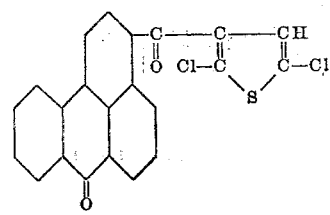

EXAMPLE 3

Ten parts of 2-thienylvinylketone, 18 parts of 10-methylene-2-chloroanthrone and 60 parts of nitrobenzene were heated together, with stirring, to about 170° C. After completion of the exothermic reaction which takes place, the reaction mixture was maintained at 175° C.–180° C. for 30 minutes, after which it was cooled to 80° C. and diluted with an equal volume of methyl alcohol. The reaction mixture was then chilled and the greenish-yellow product which precipitated out was recovered by filtration, washed with methyl alcohol and dried. Ten parts of Bz 1-(2-thenoyl)-6-chlorobenzanthrone having the formula:

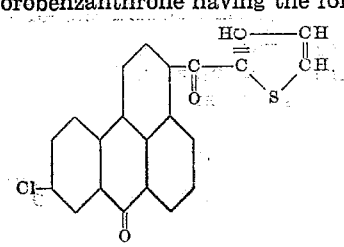

were thus obtained. It dissolves in concentrated $H_2SO_4$ with a scarlet coloration and melts at about 240° C. with charring.

By the use of 18 parts of 10-methylene-3-chloroanthrone and 21.3 parts of 10-methylene-4-bromoanthrone, respectively, in place of 10-methylene-2-chloroanthrone in the above example, Bz 1-(2 - thenoyl)-7-chlorobenzanthrone and Bz 1-(2-thenoyl)-8-bromobenzanthrone, respectively, are obtained. Similarly, by the use of 10 parts of 3-thienylvinylketone in place of 2-thienylvinylketone in the above example, Bz 1-(3-thenoyl)-6-chlorobenzanthrone is obtained.

EXAMPLE 4

Thirty parts of 10-methylene-2-methylanthrone were reacted with 34 parts of 2,5-dichloro-3-($\beta$ - dimethylaminopropionyl)thiophene hydrochloride in accordance with the procedure described in Example 2. Sixteen parts of Bz 1-[3-(2,5-dichlorothenoyl)] - 6 - methylbenzanthrone were obtained as a yellow solid melting at about 170° C. It dissolves in concentrated $H_2SO_4$ with a red coloration.

Following the procedure set forth in Examples 1 to 4, inclusive, other vat dye intermediates of the invention can be prepared. Thus, Bz 1-(2-thenoyl) - 7 - methylbenzanthrone, Bz 1 - (2-thenoyl)-1-fluorobenzanthrone, Bz 1-(2-thenoyl)-6-methylbenzanthrone, Bz 1-[3-(2,5 - dichlorothenoyl)]-6-chlorobenzanthrone, Bz 1-[3-(2,5-dichlorothenoyl)]-7-chlorobenzanthrone, Bz 1 - (2-thenoyl)-5-methylbenzanthrone and Bz 1 - (3-thenoyl)-7-chlorobenzanthrone, are also readily prepared.

Preparation of vat dye compounds

EXAMPLE 5

An intimate mix of 17 parts of Bz 1-(2-thenoyl) benzanthrone and 10 parts of $MnO_2$ (90% pure) were added to a melt of 160 parts of $AlCl_3$ and 80 parts of NaCl at 150° C.–160° C. Heating was discontinued during this operation because of the exothermic character of the reaction. The reaction mixture was then held at 185° C.–190° C. for two to three hours, poured onto ice, boiled and filtered. The filter cake thus obtained was washed with water until neutral and then dissolved in a solution of 20 parts of sodium hydroxide and 20 parts of sodium hydrosulfite in 2000 parts of water at 60° C., filtered and the filtrate blown with air. The filter cake obtained on filtration was placed in dilute aqueous NaOH and treated with sodium hypochlorite at 70° C.–80° C. until no further change took place. The reaction mixture was then filtered and the product obtained on the filter was washed well with water and dried. Sixteen parts of 2,3-(2,3-thienyl)-7,8-benzo-pyrene-1,6-dione having the formula:

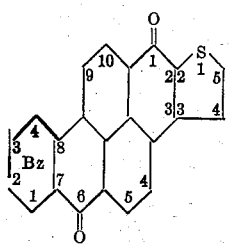

were obtained as an orange solid. It dyes cotton fast golden yellow shades from a scarlet vat. It dissolves in concentrated $H_2SO_4$ with a red-violet coloration.

By the use of 17 parts of Bz 1-(3-thenoyl) benzanthrone in place of Bz 1-(2-thenoyl) benzanthrone in the above example, 2,3-(3,4-thienyl)-7,8-benzo-pyrene-1,6-dione is obtained.

EXAMPLE 6

An intimate mix of 17 parts of Bz 1-[3-(2,5-dichlorothenoyl)] benzanthrone and 20 parts of $MnO_2$ (67%) were added to a melt of 600 parts of $AlCl_3$ and 200 parts of NaCl at 150° C.–170° C., the heat source being removed during the addition because of the exothermic character of the reaction. The remainder of the process was carried out in accordance with the procedure described in Example 5. Fourteen parts of 2,3-[3,4-(2,5 - dichlorothienyl)] - 7,8 - benzo - pyrene-1,6-dione were obtained as an orange powder. It dyes cotton fast (especially to light) shades of orange from an orange-red vat and has the formula:

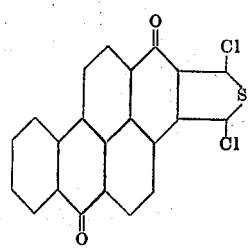

EXAMPLE 7

The process of Example 5 was followed omitting the $MnO_2$. In place of $MnO_2$, a slow stream of oxygen was passed into the reaction mixture for ten hours while maintaining the reaction mixture at 185° C.–190° C. Twelve to 14 parts of a product identical with the product of Example 5 were obtained.

EXAMPLE 8

An intimate mix of 17 parts of Bz 1-[3-(2,5-dichlorothenoyl)] benzanthrone and 20 parts of $MnO_2$ (67%) were added to a melt of 600 parts of $AlCl_3$ and 200 parts of NaCl at 150° C.–170° C., the heat source being removed during the addition because of the exothermic character of the reaction. The reaction mixture was allowed to stand for 2.5 hours and then 6 parts of bromine were slowly added and the reaction mixture allowed to stand for 3 hours longer. Upon working up the reaction mixture in accordance with the procedure described in Example 5, 17 parts of an orange-brown powder dyeing cotton fast shades, that are slightly redder than those obtained with the product of Example 6, from a red vat were obtained.

EXAMPLE 9

To a dyestuff melt prepared exactly as described in Example 5, there were added slowly after 2 hours 10 parts of bromine. After addition of the bromine the reaction mixture was allowed to stand for 3 hours, after which it was worked up in accordance with the procedure described in Example 5. Nineteen parts of a product dyeing cotton fast orange shades from a scarlet vat were obtained.

EXAMPLE 10

Twenty parts of the product formed as described in Example 1 were stirred in 100 parts of 95% $H_2SO_4$. One part of sulfur was added and chlorine was passed into the reaction mixture while maintaining the reaction temperature below 80° C. When no more chlorine was taken up by the reaction mixture, the reaction mixture was drowned in water and the reaction mixture thus obtained was filtered. The product obtained on the filter was purified by treatment with sodium hypochlorite. Twenty parts of a product which dyes cotton fast orange shades from a red vat were obtained.

EXAMPLE 11

An intimate mix of 19 parts of Bz 1-(2-thenoyl)-6-chlorobenzanthrone and 10 parts of $MnO_2$ (90%), were added to a melt of 160 parts of AlCl₃ and 80 parts of NaCl at 150° C.–160° C. and the reaction was conducted and the reaction mixture worked up in accordance with the procedure described in Example 5. Sixteen parts of 2,3-(2,3-thienyl) - 7,8 - (2 - chlorobenzo) - pyrene - 1,6-dione were obtained as an orange powder. It has the formula:

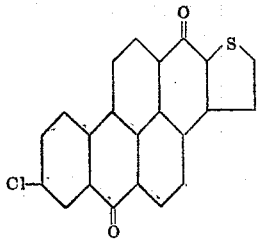

and dyes cotton golden orange shades from a red vat.

By the use of 19 parts of Bz 1-(2-thenoyl)-7-chlorobenzanthrone and 18 parts of Bz 1-(2-thenoyl)-5-methylbenzanthrone, respectively, in place of Bz 1-(2-thenoyl)-6-chlorobenzanthrone in the above example, 2,3-(2,3-thienyl)-7,8-(3-chlorobenzo)-pyrene-1,6-dione and 2,3-(2,3-thienyl)-7,8-(1-methylbenzo)-pyrene-1,6-dione, respectively, are obtained.

EXAMPLE 12

An intimate mix of 22 parts of the product of Example 4, (i. e. Bz 1-[3-(2,5-dichlorothenoyl)]-6-methylbenzanthrone), and 10 parts of MnO₂ (90%), were added to a melt of 160 parts of AlCl₃ and 80 parts of NaCl at 150° C.–160° C. and the reaction was conducted and the reaction mixture worked up in accordance with the procedure described in Example 5. Seventeen parts of 2,3-[3,4-(2,5-dichlorothienyl)]-7,8-(2-methylbenzo)-pyrene-1,6-dione were obtained as an orange powder. It has the formula:

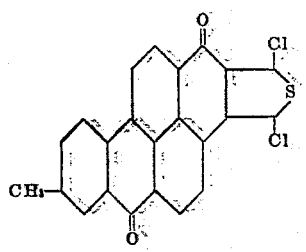

and dyes cotton orange shades from a scarlet vat.

By the use of 23.1 parts of Bz 1-[3-(2,5-dichlorothenoyl)]-6-chlorobenzanthrone and 26.4 parts of Bz 1-[3-(2,5-dichlorothenoyl)]-8-bromobenzanthrone, respectively, in place of Bz 1-[3-(2,5-dichlorothenoyl)]-6-methylbenzanthrone in the above example, 2,3-[3,4-(2,5-dichlorothienyl)]-7,8-(2-chlorobenzo) - pyrene-1,6-dione and 2,3-[3,4-(2,5-dichlorothienyl)]-7,8-(4-bromobenzo) - pyrene-1,6-dione, respectively, are obtained.

Following the procedure described hereinbefore, other vat dye compounds of the invention can be prepared. To illustrate, 2,3-(2,3-thienyl)-7,8-(4-bromobenzo)-pyrene-1,6-dione, 2,3-(2,3-thienyl)-7,8-(1-fluorobenzo)-pyrene - 1,6-dione, 2,3 - (2,3-thienyl)-7,8-(1-chlorobenzo)-pyrene-1,6-dione, 2,3 - [3,4-(2,5-dichlorothienyl)]-7,8-(1-fluorobenzo) - pyrene-1,6-dione and 2,3-(3,4-thienyl)-7,8-(2-chlorobenzo) - pyrene-1,6-dione are also readily prepared.

Dyeing with the vat dye compounds of the invention is performed according to the usual strong-alkali vat procedure. Dyeing can be carried out as follows: 0.05 gram of dyestuff are well ground with a few drops of Monopol oil (sulfonated castor-oil) and rinsed into a dye-bath. The dye-bath is brought to a total volume of 100 cc., using soft water, and 0.5–1 gram of NaOH and 0.75–1 gram of sodium hydrosulfite are added. The temperature of the dye-bath is raised to 50° C. and 5 grams of a well wet-out cotton goods are entered and dyed at 50° C.–55° C. for 1 hour. The dyed cloth is removed, rinsed and hung in air until oxidation is complete. The dyeings are finished by a 20 minute boil in a 0.5% aqueous sodium carbonate solution, rinsing with water and drying. While the manner in which my new vat dye compounds are applied to cotton, for example, constitutes no part of my invention, it will be understood that the dyeing procedure given above is merely illustrative and not limitative of the manner in which they may be applied to cotton goods.

While methyleneanthrone and a number of substituted methyleneanthrone compounds are known compounds, it is here noted that methyleneanthrone can be prepared as described by K. H. Meyer, Liebigs Annalen, vol. 420, page 135 (1920). Substituted methylene anthrone compounds can be prepared by the method just referred to for the preparation of methyleneanthrone by the use of a substituted anthrone compound in place of anthrone.

We claim:

1. The compounds having the general formula:

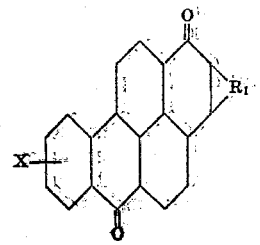

wherein R₁ stands for a thienyl radical selected from the group consisting of an unsubstituted thienyl nucleus joined to the 7,8-benzo-pyrene-1,6-dione nucleus through the carbon atoms in its 2- and 3-positions, an unsubstituted thienyl nucleus joined to the 7,8-benzo-pyrene-1,6-dione nucleus through the carbon atoms in its 3- and 4-positions and a 2,5-dichlorothienyl nucleus joined to the 7,8-benzo-pyrene-1,6-dione nucleus through the carbon atoms in its 3- and 4-positions and X represents a member selected from the group consisting of a chlorine atom, a bromine atom, a fluorine atom and a methyl group.

2. The compound having the formula:

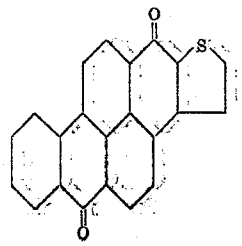

3. The compound having the formula:

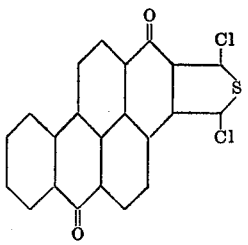

4. The compound having the formula:

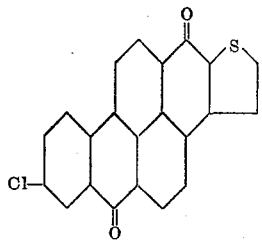

5. The compound having the formula:

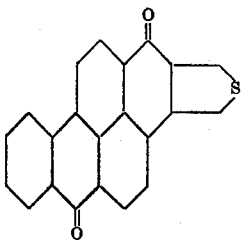

6. The compound having the formula:

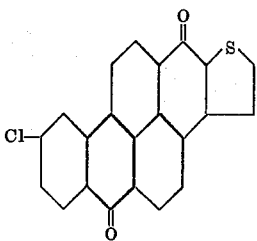

7. The process of preparing 2,3-thienyl-7,8-benzo-pyrene-1,6-dione compounds which comprises heating a Bz 1-thenoylbenzanthrone compound with a mild oxidizing agent at a temperature of about 160° C. to about 180° C. in the presence of an $AlCl_3$-NaCl melt.

8. The process of preparing 2,3-(2,3-thienyl)-7,8 - benzopyrene-1,6 - dione which comprises heating Bz-1-(2-thenoyl) benzanthrone with a mild oxidizing agent at a temperature of about 160° C. to about 180° C. in the presence of an $AlCl_3$-NaCl melt.

JAMES M. STRALEY.
RAYMOND C. HARRIS.

No references cited.